United States Patent [19]

Frazzell et al.

[11] Patent Number: 4,642,057
[45] Date of Patent: Feb. 10, 1987

[54] SHOCK ABSORBING PROPELLER

[75] Inventors: Michael E. Frazzell, Neenah; Richard H. Snyder, Oshkosh, both of Wis.

[73] Assignee: Brunswick Corporation, Skokie, Ill.

[21] Appl. No.: 770,006

[22] Filed: Aug. 27, 1985

Related U.S. Application Data

[63] Continuation of Ser. No. 562,764, Dec. 19, 1983, abandoned.

[51] Int. Cl.⁴ .......................................... B63H 21/30
[52] U.S. Cl. ........................................ 440/52; 464/89
[58] Field of Search ...................... 440/52, 78, 83, 89, 440/79, 80-82; 416/134 R, 134 A; 464/32, 89, 180

[56] References Cited

U.S. PATENT DOCUMENTS 4,452,591 6/1984 Fishbaugh et al. ............. 416/134 R

FOREIGN PATENT DOCUMENTS 517396 2/1955 Italy ....................................... 464/89

Primary Examiner—Sherman D. Basinger
Assistant Examiner—Jesûs D. Sotelo
Attorney, Agent, or Firm—O. T. Sessions

[57] ABSTRACT

A marine propeller mounting arrangement includes a sleeve member (14) for mounting on a propeller shaft (11), a propeller (10) having an inner hub (17) which fits over the sleeve member (14) and a cushion member (16) fitting between the sleeve member (14) and the propeller inner hub (17). The sleeve member (14) includes radially extending projections (26) registering with channels (31) in the hub to positively drive the propeller (10), even in the event of failure of the cushion member (16). The propeller (10) has an outer hub (28) surrounding the inner hub (17) to define an exhaust gas passageway through the propeller (10).

17 Claims, 5 Drawing Figures

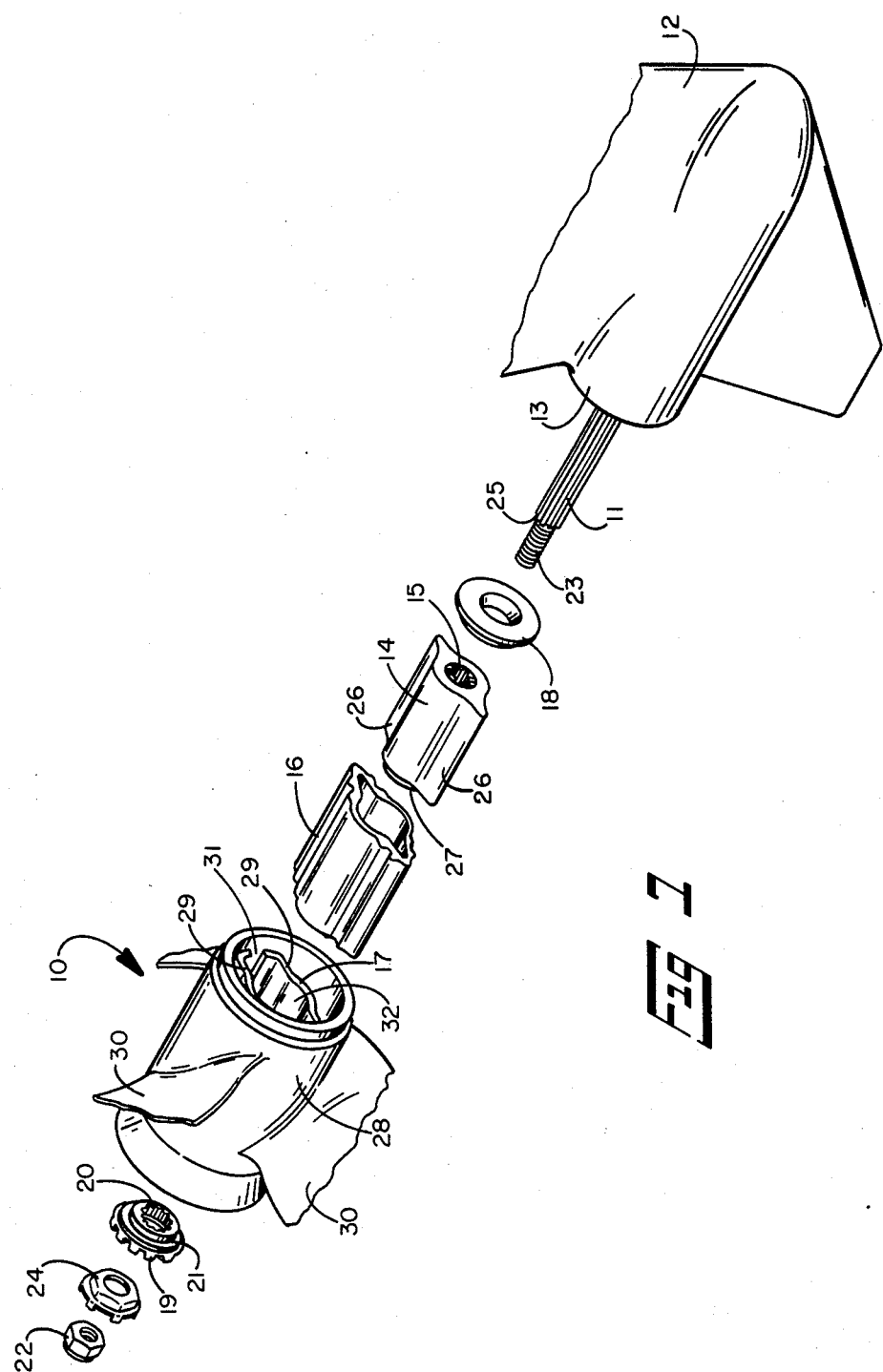

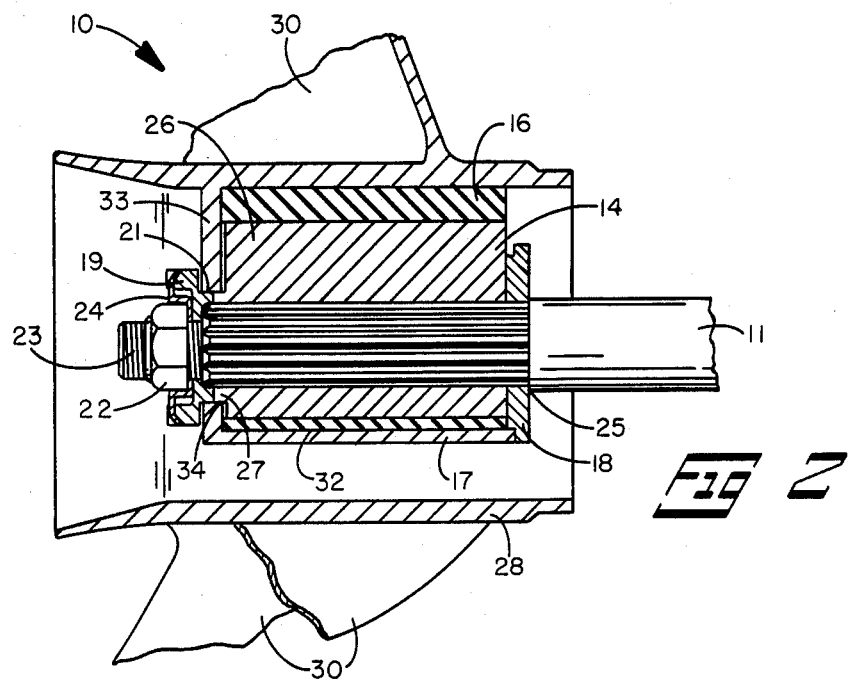
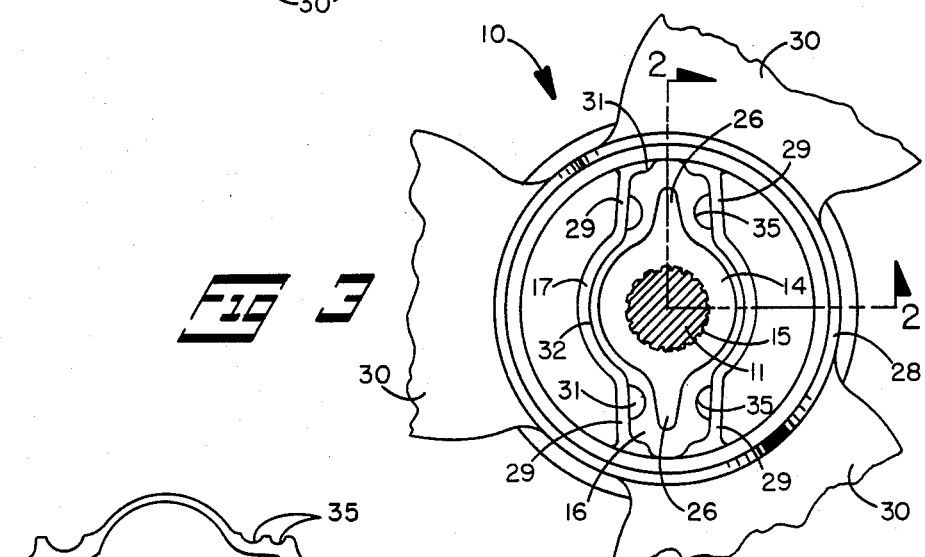
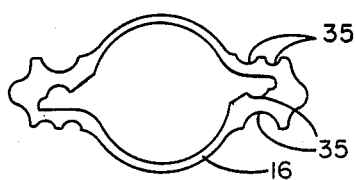
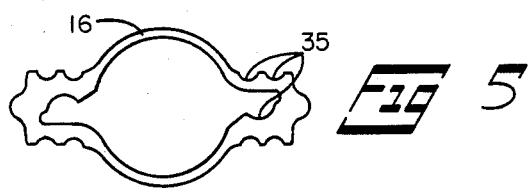

SHOCK ABSORBING PROPELLER

This application is a continuation, of application Ser. No. 562,764, filed Dec. 19, 1983, now abandoned.

DESCRIPTION

TECHNICAL FIELD

This invention relates to arrangements for mounting a propeller on a propeller shaft of a marine propulsion device and particularly to such an arrangement having a shock absorbing structure.

BACKGROUND ART

Marine propeller mounting arrangements are known which use resilient hubs to protect the propeller and propeller drive train from the shock which can result from impact between the propeller and submerged obstacles or from shifting gears. Among them, U.S. Pat. No. 3,045,763 to Perrott, issued July 24, 1962, discloses a shock absorbing drive means for use on a propeller which is also protected by a shear pin. The Perrott device utilizes ribs on a drive sleeve engaging corresponding grooves in the hub of a propeller to drive the propeller. The ribs are each covered with rubber to provide some shock absorbtion.

DISCLOSURE OF INVENTION

The invention provides a propeller mounting arrangement including a sleeve member for mounting on a propeller shaft, a propeller having a hub which fits over the sleeve member, and a cushion member fitting between the sleeve member and the propeller hub and encircling the sleeve member. The sleeve member includes radially outwardly extending projections positioned axially along the sleeve member and loosely registering with corresponding channels in the inner hub of the propeller. The propeller has an outer hub surrounding the inner hub to define an exhaust gas passageway with a plurality of vanes supporting the outer hub on the inner hub. The channels in the inner hub have walls defined by the vanes. The cushion member engages the walls of both the projections from the sleeve member and the walls of the channels and includes void spaces between the walls to increase the cushioning effect between the projections and walls of the channels.

The void spaces in the cushion member preferably are aligned with the axis of the sleeve member and are formed on the surface of of the member to facilitate manufacture.

By providing the cushion member with thicker walls on one side of the sleeve member to provide the greatest cushioning effect when the propeller is driven in the forward direction, the space required by the cushioning system can be reduced. Limiting the number of propeller driving ridges to two also tends to increase the space available for cushioning against impacts while maintaining the required area for the exhaust gas passageway.

DESCRIPTION OF THE DRAWINGS

FIG. 1 is an exploded view of a shock absorbing propeller assembly incorporating the invention.

FIG. 2 is a longitudinal partial sectional view of the propeller assembly of FIG. 1.

FIG. 3 is a sectional view of the propeller of FIG. 1.

FIG. 4 is an end view of an alternate embodiment of the cushion member suitable for use in the assembly of claim 1.

FIG. 5 is an end view of a second alternate embodiment of the cushion member.

BEST MODES FOR CARRYING OUT THE INVENTION

As shown in the drawings a marine propeller 10 is supported on the propeller shaft 11 of an outboard propulsion unit 12. The outboard propulsion unit 12, such as typically found on an outboard motor or stern drive, includes an exhaust gas passageway 13 for directing engine exhaust aft to be discharged through the hub of the propeller 10.

The propeller 10 is supported on the splined propeller shaft 11 by a sleeve member 14 having female splines 15 mating with those of the propeller shaft 11. A cushion member 16 fits in telescoping relationship between the sleeve member 14 and the propeller inner hub 17 to provide a shock absorbing cushion between the propeller 10 and the propeller shaft 11. A forward thrust hub 18 is provided to carry the forward thrust from the propeller 10 to the propeller shaft 11 and assist in centering the forward portion of the propeller relative to the shaft 11. An aft splined washer 19 has female splines 20 engaging the propeller shaft splines and a shoulder 21 which assists in centering the aft portion of the propeller 10. The entire assembly is retained on the propeller shaft 11 by a nut 22 engaging the threads 23 at the end of the propeller shaft 11, with the nut 22 locked against rotation by a tab washer 24 having tabs which engage the splined washer 19 in a conventional manner.

The sleeve member 14 has internal splines 15 engaging the splines on the propeller shaft 11 and abuts against the thrust hub 18 which in turn abuts against a shoulder 25 on the propeller shaft 11. The sleeve member 14 is formed of metal and includes two diametrically opposed ridges 26 extending radially outward to transmit torque. The ridge 26 are smoothly faired into the body of the sleeve member 14 to avoid stress concentrations. The sleeve member 14 has a 2° taper from its forward end aft to facilitate both casting and assembly. At the aft end of the sleeve member 14 an annular projection 27 is provided to support the propeller 10.

The propeller 10 includes an inner hub 17 and an outer hub 28 with the outer hub 28 supported on the inner hub 17 by vanes 29. A propeller 10 having three blades 30 on the outer hub 28 is shown through any suitable number of blades could be used. The inner hub 17 is provided with two deep channels 31 extending radially outward and having walls defined by the vanes 29 to accommodate the ridges 26 on the sleeve member 14 and the cushion member 16. Both the inner bore 32 of the inner hub 17 and the channels 31 have a 2° taper. At the forward end the inner diameter of the inner hub 17 is sized to mate with the thrust hub 18, with the reduced diameter portion of the thrust hub 18 nesting closely inside the inner bore 32 to center the forward end of the propeller 10 on the propeller shaft 11. At the aft end of the propeller inner hub 17 the cup defined by the inner hub 17 and channels 31 is closed by a flange 33 except for a central circular opening 34. The circular opening 34 nests around the annular projection 27 at the aft end of the sleeve member and the similar projection on the aft splined washer 19 to center the aft end of the propeller 10 on the propeller shaft 11. Thus the propeller 10 is held coaxial with the propeller shaft 11.

The cushion member 16 is formed of a shock absorbing elastomer, natural rubber in the preferred embodiment, and its between the tapered sleeve member 14 and the tapered inner bore 32 of the inner hub 17 of the propeller 10 to absorb shock between the sleeve member 14 and the propeller 10. The cushion member 16 may be in either a relaxed or slightly compressed state when the propeller 10 is held in place by the nut 22 and tab washer 24. To increase the cushioning effect provided by the cushion member 16, grooves 35 are formed in the cushion member 16 between the walls of the channels 31 and the ridges 26 on the sleeve member 14. The grooves 35 leave void spaces between the walls, thus allowing greater compression of the cushion member 16 when a shock loading is imposed on the cushion member 16, either by shifting gears or when the propeller 10 collides with an underwater object.

Several forms of the cushion member 16 are shown in FIGS. 3, 4, and 5, all formed of the same material. The embodiment shown in FIG. 3 positions the sleeve member 14 symmetrically in the propeller 10, thus providing equal cushioning against impacts from either direction while those shown in FIGS. 4 and 5 position the sleeve member ridges 26 to provide greater cushioning against impacts occurring when the propeller 10 is rotating in the clockwise direction, as viewed in the figures. The cushion members 16 of FIG. 4 and 5 thus allow the greatest shock absorption to be provided when the propeller 10 is rotating in a direction to drive it forward and will most frequently be operating at its highest speeds.

The grooves 35 in all of the cushion members 16 are formed on the external surfaces of the members 16, thus allowing the members to be cast with relatively simple permanent die molds. While the grooves 35 are illustrated as axially aligned with the sleeve member 14, other orientations are possible and could even be formed as holes rather than grooves. Though the shape and orientation of the void spaces in the cushion member 16 is not critical, the void spaces should be arranged to provide an initial stiffness great enough to prevent any substantial deformation of the cushion member 16 during normal operation while allowing substantial deflection during shifting or upon impact.

In operation, the cushion member 16 is slightly compressed between the walls of the channels 31 in the propeller 10 and the ridges 26 on the sleeve member 14 as the propeller 10 is driven by the propeller shaft 11. Because the cushion member 16 is loaded in compression during normal operation, there is little chance of its failing in operation. Further even should the cushion member 16 fail, the ridges 26 on the sleeve member 14 extend into the channels 31 and would continue to drive the propeller 10. Should the propeller 10 impact with an under water object, the voids in the cushion member 16 will allow some rotation of the propeller shaft 11 and sleeve member 14 relative to the propeller 10 to cushion the impact. The voids in the cushion member 16 serve to further the cushion effect by increasing the relative rotation between the sleeve member 14 and the propeller 10 under impact loading.

We claim:

1. A propeller mounting arrangement for a marine outboard propulsion unit having an exhaust gas passage to discharge engine exhaust through a propeller hub, said propeller mounting arrangement comprising:
    (A) a sleeve member having a plurality of radially outwardly extending projections positioned axially along said sleeve member and having an inner bore for drivingly engaging a propeller shaft;
    (B) a single unitary propeller having an outer hub, propeller blades attached to said outer hub, an inner hub, and a plurality of vanes connecting said inner hub with said outer hub to form an exhaust gas passageway between said inner and outer hubs, said inner hub having a central bore therethrough and a plurality of channels in the wall of said central bore extending radially outward between said vanes and having walls defined by said vanes, said projections on said sleeve member extending radially outward beyond said central bore into said channels to loosely register with said channels and limit the relative rotation between said sleeve member and said propeller in the absence of any member interposed between said sleeve member and said propeller inner hub; and
    (C) a single unitary cushion member encircling said sleeve member, said cushion member fitting in telescoping relationship between said sleeve member and said propeller inner hub, said cushion member engaging the walls of said channels and projections and including void spaces between the walls of said channels and projections, said void spaces radially located between the outer extremities of said projections and the periphery of said central bore.

2. The propeller mounting arrangement defined in claim 1 wherein said void spaces extend axially in said cushion member.

3. The propeller mounting arrangement defined in claim 2 wherein said void spaces are formed on the surface of said cushion member.

4. The propeller mounting arrangement defined in claim 1 wherein at least one of said sleeve member, said cushion member, and said central bore is tapered along its axis.

5. The propeller mounting arrangement defined in claim 1 wherein each of said sleeve member, said cushion member, and said central bore is tapered along its axis.

6. The propeller mounting arrangement defined in claim 1 wherein said cushion member is formed of an elastomeric material.

7. The propeller mounting arrangement defined in claim 1 wherein said plurality of projections consists of two diametrically opposed ridges and said plurality of channels consists of two diametrically opposed grooves.

8. The propeller mounting arrangement defined in claim 1 wherein said channels extend radially outward from said central bore to said outer hub and have their outer most portions defined by said outer hub.

9. A propeller mounting arrangement for a marine outboard propulsion unit having an exhaust gas passage to discharge engine exhaust through a propeller hub, said propeller mounting arrangement comprising:
    (A) a sleeve member having just two radially outwardly extending projections positioned axially along said sleeve member and having an inner bore for drivingly engaging a propeller shaft;
    (B) a single unitary propeller having an outer hub, propeller blades attached to said outer hub, an inner hub, and a plurality of vanes connecting said inner hub with said outer hub to form an exhaust gas passageway between said inner and outer hubs, said inner hub having a central bore therethrough and just two channels in the wall of said central bore extending radially outward between said vanes and having walls defined by said vanes, said projections on said sleeve member extending radially outward beyond said central bore into said channels to loosely register with said channels whereby relative rotation between said sleeve member and said propeller is limited; and (C) a single unitary cushion member encircling said sleeve, said cushion member fitting in telescoping relationship between said sleeve member and said propeller inner hub, said cushion member engaging the walls of said channels and projections.

10. The propeller mounting arrangement defined in claim 9 wherein at least one of said sleeve member, said cushion member, and said central bore is tapered along its axis.

11. The propeller mounting arrangement defined in claim 9 wherein each of said sleeve member, said cushion member, and said central bore is tapered along its axis.

12. The propeller mounting arrangement defined in claim 9 wherein said cushion member is formed of an elastomeric material.

13. The propeller mounting arrangement defined in claim 9 wherein said propeller includes more than two blades attached to said outer hub.

14. The propeller mounting arrangement defined in claim 9 wherein said channels extend radially outward from said central bore to said outer hub and have their outer most portions defined by said outer hub.

15. A propeller mounting arrangement for a marine outboard propulsion unit having an exhaust gas passage to discharge engine exhaust through a propeller hub, said propeller mounting arrangement comprising:
(A) a sleeve member having a plurality of radially outwardly extending projections positioned axially along said sleeve member and having an inner bore for drivingly engaging a propeller shaft;
(B) a single propeller having an outer hub, propeller blades attached to said outer hub, an inner hub, and a plurality of vanes connecting said inner hub with said outer hub to form an exhaust gas passageway between said inner and outer hubs, said inner hub having a central bore therethrough and a plurality of channels in the wall of said central bore extending radially outward between said vanes, said projections on said sleeve member extending radially outward beyond said central bore into said channels to loosely register with said channels and
(C) a single unitary cushion member encircling said sleeve member, said cushion member fitting in telescoping relationship between said sleeve member and said propeller inner hub, said cushion member engaging the walls of said channels and projections and including void spaces between the walls of said channels and projections, said void spaces radially located between the outer extremities of said projections and the periphery of said central bore, said cushion member having walls that are thicker on one side of said sleeve member projections than on the other side.

16. A propeller mounting arrangement for a marine outboard propulsion unit having an exhaust gas passage to discharge engine exhaust through a propeller hub, said propeller mounting arrangement comprising:
(A) a sleeve member having just two radially outwardly extending projections positioned axially along said sleeve member and having an inner bore for drivingly engaging a propeller shaft;
(B) a single unitary propeller having an outer hub, propeller blades attached to said outer hub, an inner hub, and a plurality of vanes connecting said inner hub with said outer hub to form an exhaust gas passageway between said inner and outer hubs, said inner hub having a central bore therethrough and just two channels in the wall of said central bore extending radially outward between said vanes, said projections on said sleeve member extending radially outward beyond said central bore into said channels to loosely register with said channels; and
(C) a single unitary cushion member encircling said sleeve, said cushion member fitting in telescoping relationship between said sleeve member and said propeller inner hub, said cushion member engaging the walls of said channels and projections, said cushion member having walls that are thicker on one side of said sleeve member projections than on the other side.

17. A propeller mounting arrangement for a marine outboard propulsion unit having an exhaust gas passage to discharge engine exhaust through a propeller hub, said propeller mounting arrangement comprising:
(A) a sleeve member having a plurality of radially outwardly extending projections positioned axially along said sleeve member and having an inner bore for drivingly engaging a propeller shaft;
(B) a single unitary propeller having an outer hub, propeller blades attached to said outer hub, an inner hub, and a plurality of vanes connecting said inner hub with said outer hub to form an exhaust gas passageway between said inner and outer hubs, said inner hub having a central bore therethrough and a plurality of channels in the wall of said central bore extending radially outward between said vanes and having walls defined by said vanes, said projections on said sleeve member extending radially outward beyond said central bore into said channels to loosely register with said channels whereby relative rotation between said sleeve member and said propeller is limited; and
(C) a single unitary cushion member encircling said sleeve member, said cushion member fitting in telescoping relationship between said sleeve member and said propeller inner hub, said cushion member engaging the walls of said channels and projections.

* * * * *